(12) United States Patent
Park et al.

(10) Patent No.: US 11,569,722 B2
(45) Date of Patent: Jan. 31, 2023

(54) SOUND VIBRATION ACTUATOR

(71) Applicant: Mplus CO., LTD., Suwon-si (KR)

(72) Inventors: Seok Jun Park, Suwon-si (KR); Jun Kun Choi, Suwon-si (KR); Yeon Ho Son, Suwon-si (KR); Yong Tae Kim, Suwon-si (KR); Yong Jin Kim, Suwon-si (KR); Seung Wook Kim, Suwon-si (KR); Dong Su Moon, Suwon-si (KR)

(73) Assignee: MPLUS CO., LTD., Suwon-si (KR)

( * ) Notice: Subject to any disclaimer, the term of this patent is extended or adjusted under 35 U.S.C. 154(b) by 495 days.

(21) Appl. No.: 16/704,039

(22) Filed: Dec. 5, 2019

(65) Prior Publication Data

US 2020/0136489 A1    Apr. 30, 2020

(30) Foreign Application Priority Data

Oct. 24, 2018    (KR) .................. 10-2018-0127318

(51) Int. Cl.
*H02K 33/18*    (2006.01)
*H04R 1/02*    (2006.01)
*H04R 9/00*    (2006.01)
*H04R 9/02*    (2006.01)
*H04R 9/06*    (2006.01)
*B06B 1/04*    (2006.01)

(52) U.S. Cl.
CPC .............. *H02K 33/18* (2013.01); *H04R 1/02* (2013.01); *H04R 9/00* (2013.01); *H04R 9/02* (2013.01); *H04R 9/025* (2013.01); *H04R 9/06* (2013.01); *B06B 1/045* (2013.01)

(58) Field of Classification Search
CPC ...... H02K 33/18; H02K 41/0356; H04R 1/02; H04R 9/00; H04R 9/02; H04R 9/025; H04R 9/06; B06B 1/045
See application file for complete search history.

(56) References Cited

U.S. PATENT DOCUMENTS 9,742,254 B1 * 8/2017 Choi .................. G06F 3/016
10,819,202 B2 * 10/2020 Chung .................. H02K 33/04
(Continued)

FOREIGN PATENT DOCUMENTS

CN    107528443 A  * 12/2017  ............. H02K 3/345
EP    1063020 A1   * 12/2000  ............... G10K 9/13
(Continued)

OTHER PUBLICATIONS

KIPO Office Action dated Jan. 23, 2020 in connection with Korean Patent Application No. 10-2018-0127318.

*Primary Examiner* — Angelica M McKinney
(74) *Attorney, Agent, or Firm* — LRK Patent Law Firm

(57) ABSTRACT

A sound vibration actuator includes: a casing having an internal space formed by an underside casing part, a side periphery casing part, and a top casing part; a coil part coupled to the top casing part in such a manner as to receive power from the outside; a magnet part disposed in the internal space of the casing and having a magnet and a weight; an elastic member whose one surface coupled to the magnet part; and a weight part coupled to the coil part. The sound vibration actuator can be varied in coupling ways of the components thereof to generate vibrations in a high frequency band as well as a low frequency band.

7 Claims, 5 Drawing Sheets

(56) References Cited

U.S. PATENT DOCUMENTS

2007/0102270 A1\* 5/2007 Takashima ............. H04R 11/02
　　　　　　　　　　　　　　　　　　　　　　　200/83 R
2019/0372446 A1\* 12/2019 Odajima ................ H02K 33/16

FOREIGN PATENT DOCUMENTS

| KR | 10-2006-0009763 A | 2/2006 |
| KR | 10-2011-0123162 A | 11/2011 |
| KR | 10-2016-0020921 A | 2/2016 |
| KR | 10-2018-0043773 A | 4/2018 |
| KR | 10-2018-0083752 A | 7/2018 |

\* cited by examiner (a)

(b)

SOUND VIBRATION ACTUATOR

CROSS REFERENCE TO RELATED APPLICATION

The present application claims the benefit of Korean Patent Application No. 10-2018-0127318 filed in the Korean Intellectual Property Office on Oct. 24, 2018, the entire content of which is incorporated herein by reference.

BACKGROUND OF THE INVENTION

1. Field of the Invention

The present invention relates to a sound vibration actuator, and more particularly, to a sound vibration actuator that is capable of generating and controlling vibrations in a high frequency band.

2. Description of Related Art

Generally, mobile terminals like smartphones have vibration functions (haptic functions) of interfacing call forwarding as well as of interfacing key input, event occurrence, and application execution to a user.) A vibration motor converting an electromagnetic force into a mechanical driving force is used as a driving device to generate up and down vibrations.

Meanwhile, as a mobile terminal has had a bezel-less design that has a screen-to-body ratio higher than 90%, recently, there are suggested new technologies wherein a sound speaker, receiver hole, and so on, which are disposed on a front surface of the mobile terminal in a conventional practice, are located inside the mobile terminal. As a result, there is developed a sound vibration actuator as one of such new technologies that controls a frequency of a vibration motor using an electromagnetic force to generate a desired sound.

So as to perform a sound function in a mobile terminal, particularly, the sound vibration actuator needs a technology capable of controlling both of vibrations having a high resonance frequency for generating high frequency sounds and vibrations in a high frequency band.

SUMMARY OF THE INVENTION

Accordingly, the present invention has been made in view of the above-mentioned problems occurring in the related art, and it is an object of the present invention to provide a sound vibration actuator that is capable of controlling a resonance frequency.

It is another object of the present invention to provide a sound vibration actuator that is capable of controlling a frequency in a high frequency band.

The technical problems to be achieved through the present invention are not limited as mentioned above, and other technical problems not mentioned herein will be obviously understood by one of ordinary skill in the art through the following description.

To accomplish the above-mentioned objects, according to the present invention, there is provided a sound vibration actuator including: a casing having an internal space formed by an underside casing part, a side periphery casing part, and a top casing part; a coil part coupled to the top casing part in such a manner as to receive power from the outside; a magnet part disposed in the internal space of the casing and having a magnet and a weight; an elastic member whose one surface coupled to the magnet part; and a weight part coupled to the coil part.

According to the present invention, desirably, the coil part includes a coil and a coil yoke.

According to the present invention, desirably, the coil yoke is disposed under the coil.

According to the present invention, desirably, the weight part is disposed on the underside of the coil yoke.

According to the present invention, desirably, the weight part is disposed between the coil and the coil yoke.

According to the present invention, desirably, the weight part has the same shape as the coil or the coil yoke.

According to the present invention, desirably, the top casing part has a protrusion protruding from the center thereof in such a manner as to seat the coil and the coil yoke thereonto.

According to the present invention, desirably, the weight part is disposed to surround the protrusion and the coil part.

According to the present invention, desirably, the weight part is coupled to the coil part by means of one selected from press-fitting, bonding, and welding.

According to the present invention, desirably, the weight part is made of a material having a higher specific gravity than the coil part and the top casing part.

According to the present invention, desirably, the casing constituted of the underside casing part, the side periphery casing part, and the top casing part is made of a magnetic material.

DETAILED DESCRIPTION OF THE EMBODIMENTS

Figure 1:
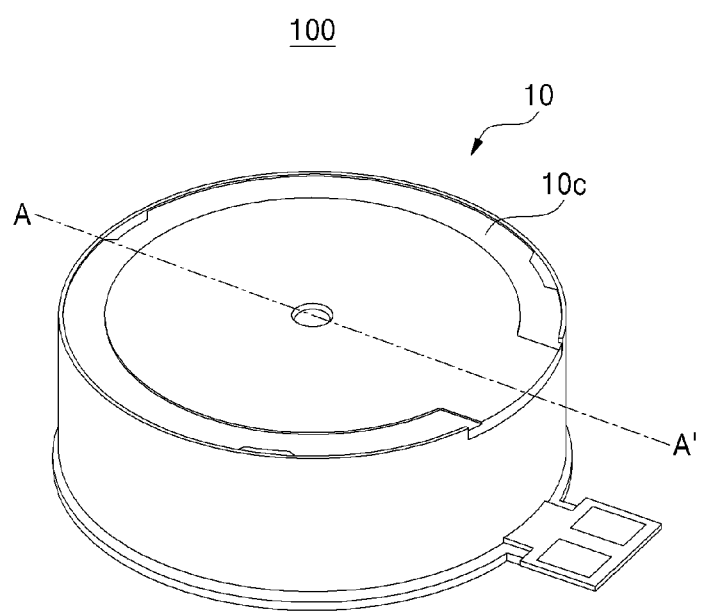
FIG. 1 is a perspective view showing a sound vibration actuator according to all embodiments of the present invention.

Hereinafter, the present invention will be explained in detail with reference to the attached drawings. In the description, it should be noted that the parts corresponding to those of the drawings are indicated by corresponding reference numerals. Objects, characteristics and advantages of the present invention will be more clearly understood from the detailed description as will be described below and the attached drawings. Before the present invention is disclosed and described, it is to be understood that the disclosed embodiments are merely exemplary of the invention, which can be embodied in various forms.

All terms (including technical or scientific terms) used herein, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

An expression referencing a singular value additionally refers to a corresponding expression of the plural number, unless explicitly limited otherwise by the context.

In this application, terms, such as "comprise", "include", or "have", are intended to designate those characteristics, numbers, steps, operations, elements, or parts which are described in the specification, or any combination of them that exist, and it should be understood that they do not preclude the possibility of the existence or possible addition of one or more additional characteristics, numbers, steps, operations, elements, or parts, or combinations thereof.

FIG. 1 is a perspective view showing a sound vibration actuator according to the present invention.

Before the present invention is described with reference to FIG. 1, first, the sound vibration actuator 100 according to the present invention is a device that generates vibrations and sounds produced by the vibrations. In detail, the sound vibration actuator 100 is adapted to generate vibrations through electromagnetic forces of internal components and is also adapted to allow at least one surface thereof to be coupled to an external sound generator S to generate sounds produced by the vibrations.

As shown in FIG. 1, the sound vibration actuator 100 has a shape of a flat cylinder and is configured to have an input terminal (having no reference numeral) exposed from a bottom periphery thereof to supply power thereto. In this case, the input terminal is a power supply terminal drawn from an interior of the sound vibration actuator 100 to the outside, and it may be formed of a flexible printed circuit (FPC).

So as to allow the input terminal to be seated onto the sound vibration actuator 100, a board seating part (having no reference numeral) is extended outward from the bottom surface of the sound vibration actuator 100, and otherwise, the underside casing part 10a protrudes outward from a given outer peripheral surface thereof.

As shown in FIG. 1, the input terminal is located on the bottom of the sound vibration actuator 100, but without being limited thereto, of course, the input terminal may be bent upward to supply power to the top side of the internal space of the sound vibration actuator 100.

Figure 2:
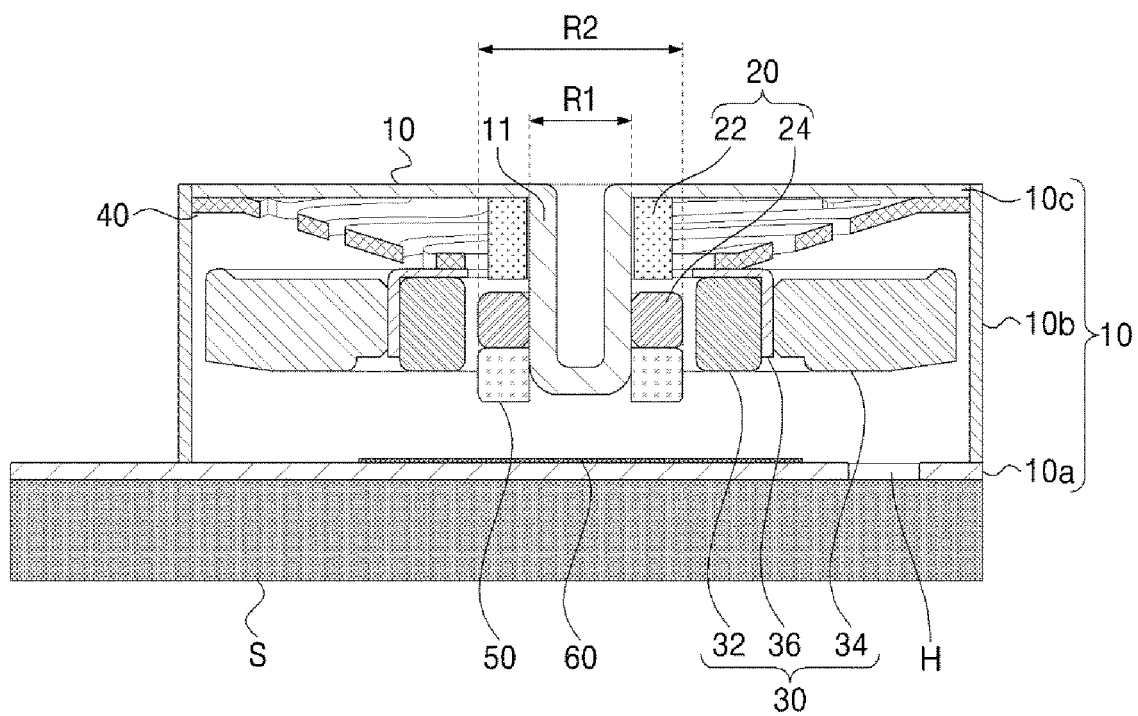
FIG. 2 is a sectional view of the first embodiment taken along the line A-A' of FIG. 1.

FIG. 2 is a sectional view of the first embodiment of the present invention taken along the line A-A' of FIG. 1.

Figure 3:
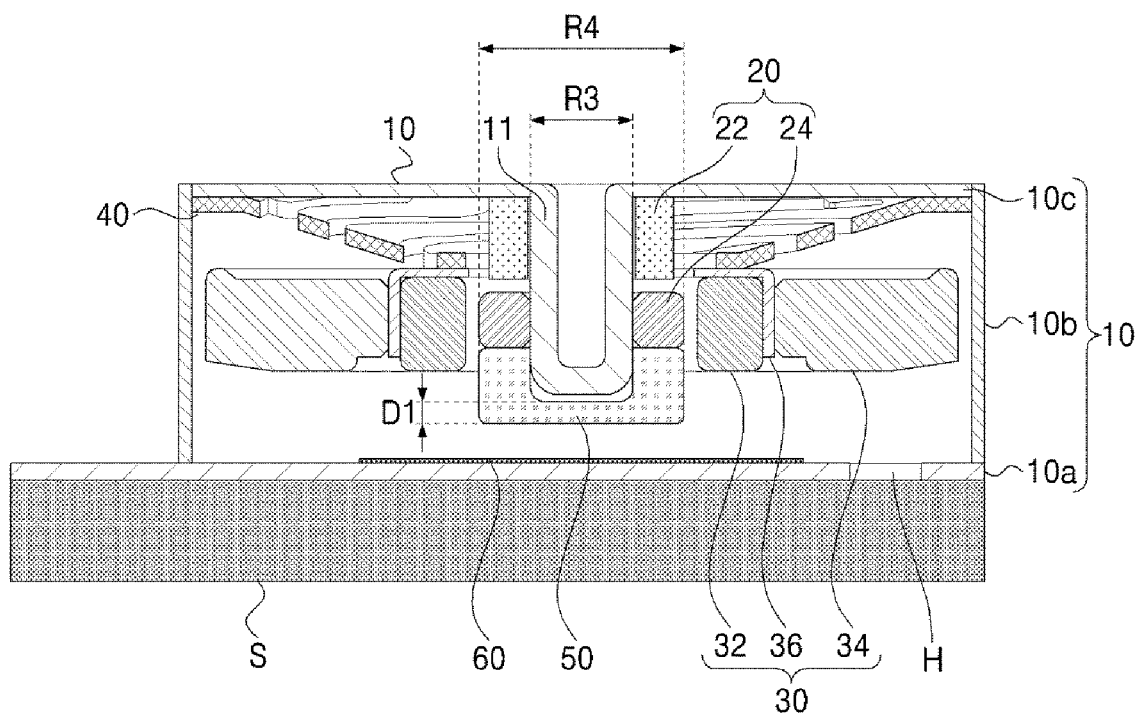
FIG. 3 is a sectional view of the second embodiment taken along the line A-A' of FIG. 1.

As shown in FIGS. 2 and 3, the sound vibration actuator 100 includes a casing 10, a coil part 20, a magnet part 30, an elastic member 40 and a weight part 50.

First, the casing 10 has a space formed therein to accommodate the casing 10, the coil part 20, the magnet part 30, the elastic member 40 and the weight part 50 therein.

The casing 10 is constituted of an underside casing part 10a, a side periphery casing part 10b, and a top casing part 10c that are coupled to each other by means of caulking, bonding or welding.

The top casing part 10c has a protrusion 11a formed at the center thereof so as to seat the coil part 20 thereonto. The protrusion 11, which has a hollow shape protruding inward from the center of the top casing part 10c, can be very easily formed by means of press or deep drawing. If the protrusion 11 has such a hollow shape, advantageously, manufacturing and coupling processes can be simple, a weight of the sound vibration actuator 100 can be reduced, a variety of magnetic materials can be inserted later into the hollow portion of the protrusion 11 from the outside to adjust the amount of magnetic flux.

The top casing part 10c may be an acoustic diaphragm, and accordingly, the coil part 20 is vibrated by an electromagnetic force generated between the magnet part 30 and itself, thereby generating sounds.

The side periphery casing part 10b is provided to the same shape as the outer peripheries of the top casing part 10c and the underside casing part 10a. According to the present invention, the side periphery casing part 10b has a shape of a cylinder, but without being limited thereto, of course, it may have a sectional shape of a square or polygon according to shapes of the top casing part 10c and the underside casing part 10a. Also, the elastic member 40 disposed in the internal space of the casing 10 has the same sectional shape as the square or polygonal side periphery casing part 10b.

The underside casing part 10a can be fixed to the external sound generator S. To do this, the underside casing part 10a has an adhesive member disposed on one surface thereof, and otherwise, it has fixing holes (not shown) punched thereon. The external sound generator S includes various kinds of mechanisms for generating sounds, for example, a display module.

Only the underside casing part 10a is fixed to the external sound generator S, and other parts are not fixed to any external devices, so that if power is supplied to the sound vibration actuator 100, the coil part 20 disposed at the inner surface of the top casing part 10c is vibrated to allow the external sound generator s connected to the sound vibration actuator 100 to generate vibrations in the range of a high frequency band. In more detail, if the coil part 20 vibrates, vibrations with a high center resonance frequency of 5000 Hz as well as with a low center resonance frequency of 100 Hz can be generated.

Further, the casing 10 having the underside casing part 10a, the side periphery casing part 10b, and the top casing part 10c is made of a magnetic material so as to optimize a magnetic field generated from the coil part 20 and the magnet part 30 disposed therein. Accordingly, the underside casing part 10a, the side periphery casing part 10b, and the top casing part 10c are made of the same magnetic material as each other, and otherwise, they may be made of different magnetic materials from each other according to a user's selection.

Next, the coil part 20 has a coil 22 and a coil yoke 24. In this case, the coil 22 and the coil yoke 24 are coupled to top of the casing 10, that is, the top casing part 10c, and since only the outer periphery of the top casing part 10c is fixed to the side periphery casing part 10b, the remaining region thereof is not fixed to any component, so that in a process where the coil 22 and the coil yoke 24 are vibrated, the top casing part 10c can be vibrated together.

Meanwhile, the coil 22 of the coil part 20 may be a sound coil that generates magnetic fields having different directions and strengths. In more detail, if an alternating current is applied to the coil 22, an alternating magnetic field is generated from the coil 22, so that the top casing part 10c coming into contact with the coil 22 is vibrated to a signal in an audible frequency range, thereby generating sounds.

The coil 22 and the coil yoke 24 of the coil part 20 are fitted to the protrusion 11 of the top casing part 10c, and the coil 22 is disposed on top of the coil yoke 24. Also, the coil 22 and the coil yoke 24 have a shape of a ring, but without being limited thereto, of course, they may have various shapes fitted to the protrusions 11.

The coil yoke 24 of the coil part 20 is fittedly disposed on the outer peripheral surface of the protrusion 11 in parallel with the coil 22, is made of a magnetic material, and serves to amplify the electromagnetic force generated from the coil 22.

In the process where the coil part 20 is vibrated according to an induced electromagnetic force generated from the coil 22 and the coil yoke 24, if the electromagnetic force corresponding to a resonance frequency of the magnet part 30 disposed parallel to the coil part 20 is generated, the magnet part 30 can be operated. Accordingly, if it is designed that the magnet part 30 has the resonance frequency in the range of 100 to 300 Hz, an alternating current corresponding to the resonance frequency is supplied to the coil part 20, so that the magnet part 30 can be operated. Of course, the resonance frequency band of the magnet part 30 can be changed according to design conditions thereof.

On the other hand, the coil part 20 is coupled to the weight part 50, so that the resonance frequency of the sound vibration actuator 100 can be controlled. In detail, if the coil part 20 is coupled to the weight part 50, a high frequency resonance band generated by the vibration of the coil part 20 can be lower than that when not coupled to the weight part 50. The weight part 50 is made of a material having a higher specific gravity than the coil part 20 or the top casing part 10c coupled to the coil part 20.

In addition, the weight part 50 has mass larger than the coil part 20 or the top casing part 10c, and even in this case, a high frequency resonance band generated by the vibration of the coil part 20 can be lower than that when not coupled to the weight part 50.

So as to control the resonance frequency of the coil part 20 by means of the weight part 50, like this, the weight part 50 is disposed on the underside of the coil part 20, that is, on the underside of the coil yoke 24 in such a manner as to allow one surface thereof to come into contact with the coil yoke 24. The weight part 50 has a shape of the same ring as the coil 22 or the coil yoke 24 and is fixed to the protrusion 11 of the top casing part 10c.

The weight part 50 is fixed to the protrusion 11 or the coil yoke 24 by means of one of press-fitting, bonding, and welding, so that while the weight part 50 is being vibrated, it can be fixed firmly to the coil part 20.

Further, the weight part 50 is made of a magnetic or non-magnetic material, and if it is made of a magnetic material, it collects the magnetic flux generated from the coil 22 in the same manner as the coil yoke 24 and amplifies the induced electromotive force. According to the present invention, an amount of magnetic flux collected and the resonance frequency can be freely varied according to various combinations in a material (magnetic or non-magnetic material) of the weight part 50, a position of the weight part 50, and a size, weight, or shape of the weight part 50.

An inner diameter R1 of the weight part 50 is the same as the outer diameter of the protrusion 11, and an outer diameter R2 thereof is freely determined according to the resonance frequency to be controlled by a user. In detail, the larger the outer diameter R2 of the weight part 50 is, the larger the mass of the weight part 50 is, so that a resonance frequency value becomes small. Accordingly, a decrement amount of the resonance frequency can be controlled through the adjustment of the outer diameter R2 of the weight part 50.

The magnet part 30 is located around the coil 22 and includes a magnet 32, a weight 34, and a yoke 36. If the alternating current is applied to the coil 22 of the coil part 20, the magnet part 30 can be operated differently in variance with the magnitude of the alternating current.

The magnet 32 of the magnet part 30 is disposed around the coil yoke 24 and can vibrates up and down cooperating with the alternating magnetic field generated from the coil 22. Though the magnet 32 is one in FIG. 2, it may include two or more magnets coupled to each other. If the two or more magnets are coupled to each other, the electromagnetic force can be stronger than that generated from one magnet.

Meanwhile, a magnetic fluid (not shown) can be applied to one of the side surfaces of the magnet 32 or the coil yokes 24 to prevent direct contact between them, thereby suppressing the noise or damage caused by direct collision between them. Further, because of its viscosity, the magnetic fluid can help the magnet 32 stop vibration more quickly after turning off the power.

The weight 34 of the magnet part 30 is disposed around the magnet 32 and serves to amplify the up and down vibrations of the magnet 32 by means of its self weight. Further, an outer diameter of the weight 34 is smaller than an inner diameter of the side periphery casing part 10b, so that in a process where the entire magnet part 30 is vibrated up and down, the contact of the magnet part 30 with the side periphery casing part 10b is prevented to ensure the reliability of the sound vibration actuator 100.

The yoke 36 of the magnet part 30 is disposed between the magnet 32 and the weight 34, and serves to form a closed magnetic circuit capable of allowing the magnetic field generated from the magnet 32 to gently flow.

The elastic member 40 is disposed on the top casing part 10c to support the magnet part 30. The elastic member 40 is decreased in diameter as it goes from the outer peripheral to the inner center and protruded downward direction. The inner surface part of the elastic member 40 is fixed to the magnet part 30, and the outer surface thereof is coupled to the top casing part 10c.

The elastic member 40 serves not only to support the magnet part 30, but also to amplify the up and down vibrations of the magnet part 30 by means of the given elasticity thereof. The elastic member 40 can be made of some magnetic materials.

On the other hand, the elastic member 40 may come into contact with the underside casing part 10a, not with the top casing part 10c, so as to support the magnet part 30. In this case, an inner center of the elastic member 40 comes into contact with the magnet part 30, and an outer periphery thereof comes into contact with the underside casing part 10a.

If the elastic member 40 is coupled to the top casing part 10c or the underside casing part 10a by means of welding, it can have a high fixing force so that a desired resonance frequency can be more accurately set.

Lastly, the sound vibration actuator 100 includes a buffering member 60 adapted to prevent the casing 10 from being damaged due to the vibrations of the weight part 50, the coil part 20 and the magnet part 30 in the internal space thereof. In detail, the buffering member 60 is disposed on the underside casing part 10a to prevent the external sound generator S from being damaged due to vibration impacts or to prevent loss in amount of vibration.

Up to now, an explanation on the internal structure of the sound vibration actuator 100 according to the first embodiment of the present invention has been given. According to the present invention, the sound vibration actuator 100 has the weight part 50 to control easily the resonance band of high frequency, so that the external sound generator S coupled to the sound vibration actuator 100 can generate sounds corresponding to such high frequency band. Accordingly, the sound vibration actuator 100 can be applied to various fields.

Hereinafter, the sound vibration actuators according to the second and third embodiments of the present invention will be explained. FIG. 3 is a sectional view of the second embodiment of the present invention taken along the line A-A' of FIG. 1

As shown in FIG. 3, the sound vibration actuator 100 includes a casing 10, a coil part 20, a magnet part 30, an elastic member 40, and a weight part 50. For the brevity of the description, an explanation on the parts having the same configurations and shapes as in the first embodiment of the present invention will be avoided.

The sound vibration actuator 100 according to the second embodiment of the present invention is provided with the weight part 50 that is adapted to surround the protrusion 11 of the top casing part 10c on the underside of the coil part 20, and through the weight part 50, accordingly, the resonance frequency of the sound vibration actuator 100 can be controlled. In more detail, the weight part 50 is made of a material having a higher specific gravity than the coil part 20 constituted of the coil 22 and the coil yoke 24 or the top casing part 10c coupled to the coil part 20, and if the coil part 20 is coupled to the weight part 50, accordingly, a high frequency resonance band generated by the vibration of the coil part 20 can be lower than that when not coupled to the weight part 50.

In addition, the weight part 50 has mass larger than the coil part 20 or the top casing part 10c, and even in this case, a high frequency resonance band generated by the vibration of the coil part 20 can be lower than that when not coupled to the weight part 50.

So as to control the resonance frequency of the coil part 20 by means of the weight part 50, like this, the weight part 50 has a given thickness D1 so that the protrusion 11 supporting the coil part 20 and one surface of the coil yoke 24 can be surrounded with the weight part 50. According to the second embodiment of the present invention, in detail, the weight part 50 has a shape of a cap fitted to the protrusion 11 in such a manner as to be coupled to the coil part 20.

The weight part 50 is fixed to the protrusion 11 or the coil yoke 24 by means of one of press-fitting, bonding, and welding, so that while the weight part 50 is being vibrated, it can be fixed firmly to the coil part 20.

Further, the weight part 50 is made of a magnetic or non-magnetic material, and if it is made of a magnetic material, it collects the magnetic flux generated from the coil 22 in the same manner as the coil yoke 24 and amplifies the induced electromotive force. According to the present invention, an amount of magnetic flux collected and the resonance frequency can be freely varied according to various combinations in a material (magnetic or non-magnetic material) of the weight part 50, a position of the weight part 50, and a size, weight, or shape of the weight part 50.

An inner diameter R3 of the weight part 50 is the same as the outer diameter of the protrusion 11, and an outer diameter R4 thereof is freely determined according to the resonance frequency to be controlled by a user. In detail, the larger the outer diameter R4 of the weight part 50 is, the larger the mass of the weight part 50 is, so that a resonance frequency value becomes small. Accordingly, a decrement amount of the resonance frequency can be controlled through the adjustment of the outer diameter R4 of the weight part 50.

In case of the weight part 50 surrounding the protrusion 11 and one surface of the coil yoke 24, further, the thickness D1 of the weight part 50 for surrounding the protrusion 11 is adjusted to control a decrement amount of the resonance frequency. In more detail, the bigger the thickness D1 of the weight part 50 is, the larger the mass of the weight part 50 is, so that a resonance frequency value becomes small. Accordingly, a decrement amount of the resonance frequency can be controlled through the adjustment of the thickness D1 of the weight part 50. However, a maximum thickness D1 of the weight part 50 has a limit value determined by considering up and down displacement (amplitude) according to the vibration of the coil part 20 or the magnet part 30.

Figure 4:
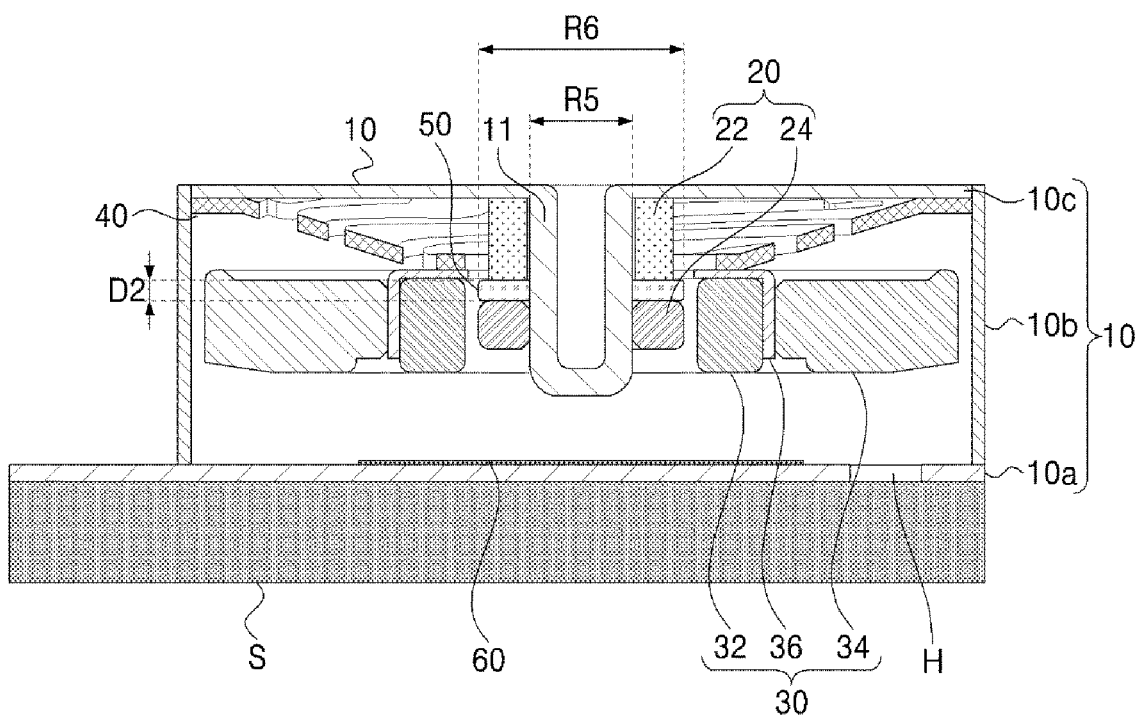
FIG. 4 is a sectional view of the third embodiment taken along the line A-A' of FIG. 1.

FIG. 4 is a sectional view of the third embodiment of the present invention taken along the line A-A' of FIG. 1.

As shown in FIG. 4, the sound vibration actuator 100 includes a casing 10, a coil part 20, a magnet part 30, an elastic member 40, and a weight part 50. For the brevity of the description, an explanation on the parts having the same configurations and shapes as in the first embodiment of the present invention will be avoided.

The sound vibration actuator 100 according to the third embodiment of the present invention is provided with the weight part 50 that is disposed between the coil 22 and the coil yoke 24, and through the weight part 50, accordingly, the resonance frequency of the sound vibration actuator 100 can be controlled. In more detail, the weight part 50 is made of a material having a higher specific gravity than the top casing part 10c coupled to the coil part 20 or the coil yoke 24, accordingly, a high frequency resonance band generated by the vibration of the coil part 20 can be lower than that when not coupled to the weight part 50.

In addition, the weight part 50 has mass larger than the coil 22 or the top casing part 10c, and even in this case, a high frequency resonance band generated by the vibration of the coil part 20 can be lower than that when not coupled to the weight part 50.

So as to control the resonance frequency of the coil part 20 by means of the weight part 50, like this, the weight part 50 is disposed between the coil 22 and the coil yoke 24 in such a manner as to have a given thickness D2. When viewed with respect to a height of the sound vibration actuator 100, in detail, the weight part 50 is disposed between the coil 22 and the coil yoke 24 at a position where the yoke 36 of the magnet part 30 is placed in such a manner as to allow one surface thereof to come into contact with the coil 22 and to allow the other surface thereof to come into contact with the coil yoke 24 in a range of a thickness of the magnet 32 of the magnet part 30.

The weight part 50, according to the third embodiment of the present invention, has a shape of the same ring as the coil 22 or the coil yoke 24 and can be fixed to the protrusion 11 and the coil part 20. The weight part 50 is fixed to the protrusion 11 or the coil yoke 24 by means of one of press-fitting, bonding, and welding, so that while the weight part 50 is being vibrated, it can be fixed firmly to the coil part 20.

Further, the weight part 50 is made of a magnetic or non-magnetic material, and if it is made of a magnetic material, it collects the magnetic flux generated from the coil 22 in the same manner as the coil yoke 24 and amplifies the induced electromotive force. According to the present invention, an amount of magnetic flux collected and the resonance frequency can be freely varied according to various combinations in a material (magnetic or non-magnetic material) of the weight part 50, a position of the weight part 50, and a size, weight, or shape of the weight part 50.

An inner diameter R5 of the weight part 50 is the same as the outer diameter of the protrusion 11, and an outer diameter R6 thereof is freely determined according to the resonance frequency to be controlled by a user. In detail, the larger the outer diameter R6 of the weight part 50 is, the larger the mass of the weight part 50 is, so that a resonance frequency value becomes small. Accordingly, a decrement amount of the resonance frequency can be controlled through the adjustment of the outer diameter R6 of the weight part 50.

In case of the weight part 50 disposed between the coil 22 and the coil yoke 24, further, the thickness D2 of the weight part 50 can be adjusted to control a decrement amount of the resonance frequency. In more detail, the bigger the thickness D2 of the weight part 50 is, the larger the mass of the weight part 50 is, so that a resonance frequency value becomes small. Accordingly, a decrement amount of the resonance frequency can be controlled through the adjustment of the thickness D2 of the weight part 50. However, a maximum thickness D2 of the weight part 50 has a limit value determined by considering the maximum value that the coil yoke 24 does not exceed the lowest position of the magnet part 30.

Figure 5:
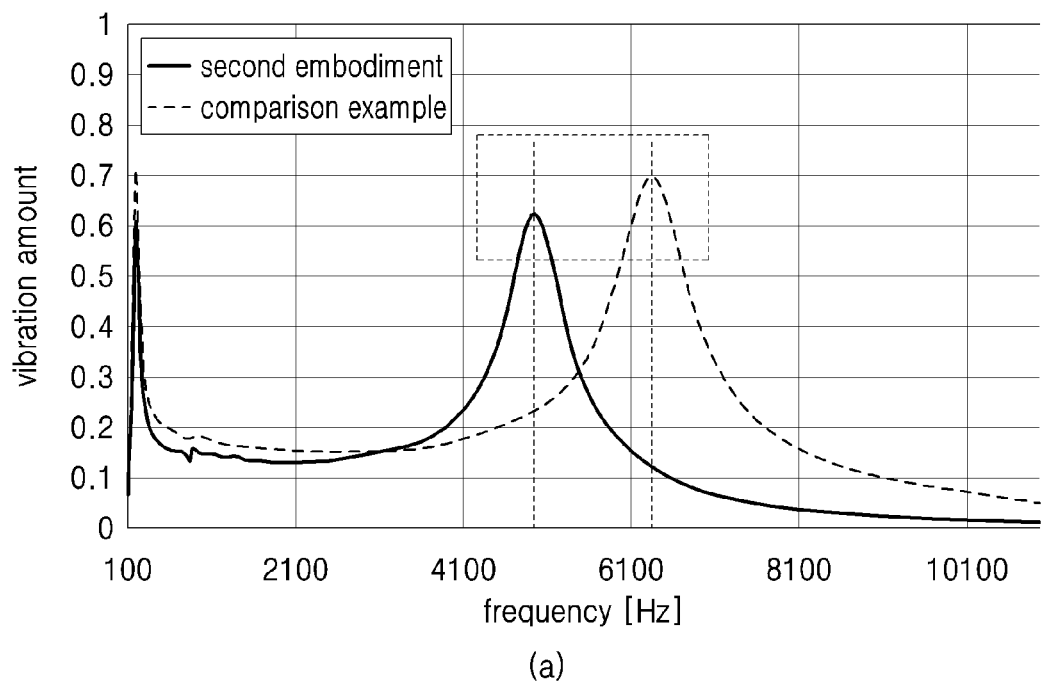
FIG. 5 is graphs showing changes in the characteristics of the sound vibration actuator according to the second embodiment of the present invention.
Figure 5:
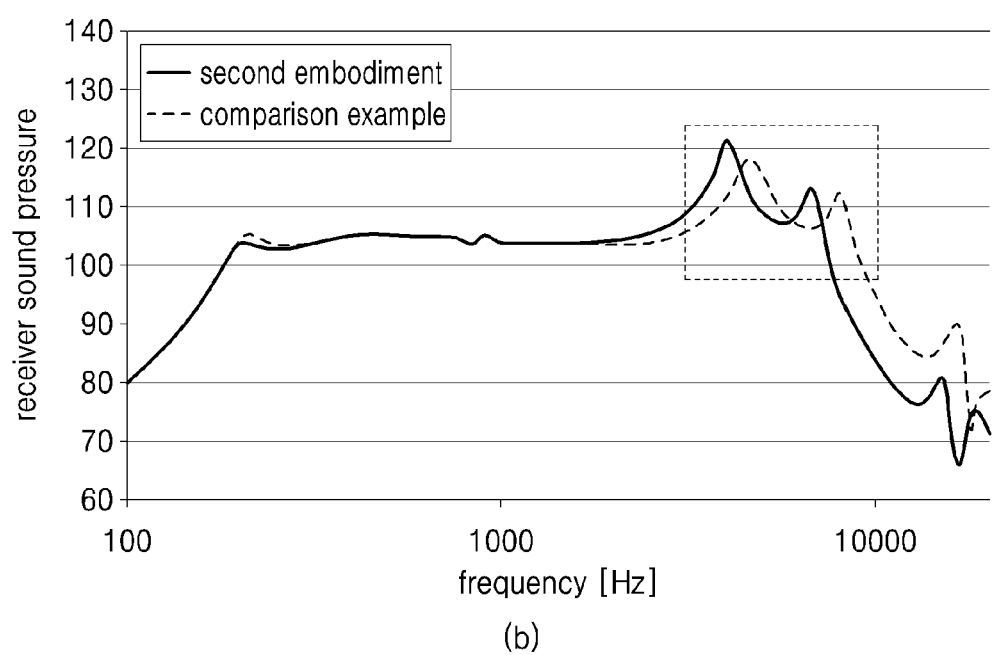

FIG. 5 is graphs showing changes in the characteristics of the sound vibration actuator according to the second embodiment of the present invention.

Referring to (a) of FIG. 5, the sound vibration actuator 100 according to the second embodiment of the present invention has the cap-like weight part 50, and accordingly, it can be checked that a high frequency resonance band becomes lower than that in a comparison example. Accordingly, the high frequency resonance band can be lowered up to a minimum 5000 Hz, so that the sound vibration actuator 100 can generate a vibration in a large range of high frequency resonance band.

Referring to (b) of FIG. 5, further, the sound vibration actuator 100 according to the second embodiment of the present invention is fixed to the external sound generator S serving as a receiver, and accordingly, it can be checked that a sound pressure dB in a high frequency band of the sound vibration actuator 100 is increased. If the weight part 50 is mounted in the sound vibration actuator 100, a high sound pressure can be generated even in a relatively low frequency band.

Up to now, an explanation on the configuration of the weight part 50 fixedly coupled to the coil part 20 of the sound vibration actuator 100 according to the embodiments of the present invention has been given. According to the present invention, the weight part 50 having various shapes is fixed to the coil part 20 from which a high frequency vibration is generated, thereby controlling a high frequency vibration in a low range, and also, even the external sound generator S mounted on the sound vibration actuator 100 can generate sounds in a large frequency range at the same sound pressure as each other.

As described above, the sound vibration actuator according to the present invention can be varied in coupling ways of the components thereof to generate vibrations in a high frequency band as well as a low frequency band.

In addition, the sound vibration actuator according to the present invention is configured to have the weight part disposed in the internal space thereof to control a high frequency resonance band.

In addition, the sound vibration actuator according to the present invention can generate sounds in the range of low to high frequency bands from the external sound generator coupled thereto.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A sound vibration actuator comprising:
a casing (10) having an internal space formed by an underside casing part (10*a*), a side periphery casing part (10*b*), and a top casing part (10*c*);
a coil part (20) coupled to the top casing part (10*c*) in such a manner as to receive power from the outside;
a magnet part (30) disposed around the coil part (20) in the internal space of the casing (10) and having a magnet (32) and a weight (34);
an elastic member (40) whose one surface coupled to the magnet part (30); and
a weight part (50) coupled to the coil part (20),
wherein the top casing part (10*c*) is formed at a top side of the casing (10) and vibrated at a sound generating frequency to generate sound,
wherein the weight (34) and the weight part (50) are provided to not face each other in an up-and-down vibration direction.

2. The sound vibration actuator according to claim 1, wherein the coil part (20) comprises a coil (22) and a coil yoke (24).

3. The sound vibration actuator according to claim 2, wherein the coil yoke (24) is disposed under the coil (22).

4. The sound vibration actuator according to claim 3, wherein the weight part (50) is disposed on an underside of the coil yoke (24) in the up-and-down vibration direction.

5. The sound vibration actuator according to claim 2, wherein the top casing part (10*c*) has a protrusion (11) protruding from a center thereof in such a manner as to seat the coil (22) and the coil yoke (24) thereonto.

6. The sound vibration actuator according to claim 1, wherein the underside casing part (10*a*) is fixed to an external sound generator (S).

7. The sound vibration actuator according to claim 1, wherein the weight part (50) is made of a material having a higher specific gravity than the coil part (20) and the top casing part (10*c*).

* * * * *